US008035288B2

(12) United States Patent
Chu et al.

(10) Patent No.: US 8,035,288 B2
(45) Date of Patent: Oct. 11, 2011

(54) MATERIAL FOR PREPARING PROTECTIVE LAYER AND PLASMA DISPLAY PANEL COMPRISING THE PROTECTIVE LAYER

(75) Inventors: Hee-Young Chu, Suwon-si (KR); Sung-Hwan Moon, Suwon-si (KR); Dong-Hyun Kang, Suwon-si (KR); Yuri Matulevich, Suwon-si (KR); Jae-Hyuk Kim, Suwon-si (KR); Mi-Hyun Lee, Suwon-si (KR); Chang-Hyuk Kim, Suwon-si (KR); Jong-Seo Choi, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 12/794,050

(22) Filed: Jun. 4, 2010

(65) Prior Publication Data

US 2010/0308710 A1   Dec. 9, 2010

(30) Foreign Application Priority Data

Jun. 5, 2009   (KR) ................. 10-2009-0049908

(51) Int. Cl.
*H01J 17/49*   (2006.01)
(52) U.S. Cl. ....................................... 313/489; 313/582

(58) Field of Classification Search .................. 313/489, 313/582–587
See application file for complete search history.

(56) References Cited

U.S. PATENT DOCUMENTS

2006/0066240 A1 *   3/2006   Ushizawa et al. ............. 313/586
2008/0024062 A1     1/2008   Kim et al.

FOREIGN PATENT DOCUMENTS

| JP | 2008-123887 | 5/2008 |
| KR | 10-0244124 | 11/1999 |
| KR | 10-2008-0013587 | 2/2008 |
| WO | WO2005/098889 A1 | 10/2005 |

* cited by examiner

*Primary Examiner* — Toan Ton
*Assistant Examiner* — Hana S Featherly
(74) *Attorney, Agent, or Firm* — Knobbe Martens Olson & Bear LLP

(57) ABSTRACT

A plasma display panel (PDP) including a protective layer and a material for preparing the protective layer that can be easily fabricated and has little defects, includes a magnesium oxide (MgO) powder including a cathode rays emission spectrum having a first emission peak in a wavelength in the range of 300 to 450 nm, a second emission peak in a wavelength in the range of 650 to 750 nm, and an intensity ratio between 1:0.15 and 0.40 as an intensity ratio of the second emission peak with respect to the first emission peak.

25 Claims, 7 Drawing Sheets

US 8,035,288 B2

MATERIAL FOR PREPARING PROTECTIVE LAYER AND PLASMA DISPLAY PANEL COMPRISING THE PROTECTIVE LAYER

CROSS-REFERENCE TO RELATED APPLICATION

This application claims the benefit of Korean Application No. 10-2009-0049908, filed Jun. 5, 2009 in the Korean Intellectual Property Office, the disclosure of which is incorporated herein by reference.

BACKGROUND OF THE INVENTION

1. Field of the Invention

An aspect of the present invention relates to a plasma display panel (PDP) that has high efficiency discharge characteristics and that can be easily fabricated, and more particularly, to a material for preparing a protective layer of a PDP and a PDP including the protective layer.

2. Description of the Related Art

A conventional plasma display panel (PDP) protective layer may be formed in double layers by coating a magnesium oxide powder prepared using a vapor phase method on a magnesium oxide poly-crystal thin film. At this time, the magnesium oxide powder can be prepared by heating magnesium in a chamber, injecting an atmosphere gas such as oxygen ($O_2$), hydrogen ($H_2$), argon (Ar), etc. into the chamber and then oxidizing the atmosphere gas. However, the magnesium oxide powder prepared using the above vapor phase method has many defects.

Since magnesium needs to be vaporized in order to prepare the magnesium oxide powder by using the above vapor phase method, the preparation time increases and the preparation conditions are complicated, thereby increasing the preparation costs.

SUMMARY OF THE INVENTION

An aspect of the present invention provides a material for preparing a protective layer having excellent discharge characteristics due to little defects and impurities and a plasma display panel (PDP) including the protective layer.

According to an aspect of the present invention, there is provided a material for preparing a protective layer of a plasma display panel (PDP), the material including a magnesium oxide (MgO) powder including cathode rays emission spectrum having a first emission peak in a wavelength in the range of 300 to 450 nm, a second emission peak in a wavelength in the range of 650 to 750 nm, and a ratio between 1:0.15 and 0.40 as an intensity ratio of the second emission peak with respect to the first emission peak.

According to another aspect of the present invention, the MgO powder may have a cluster or poly-crystal state.

According to another aspect of the present invention, the MgO powder may have purity in the range of 99.95 weight % through 100 weight %.

According to another aspect of the present invention, the MgO powder may include 0.05 weight % of at least one impurity selected from the group consisting of nickel (Ni), ferrum (Fe), boron (B), silicon (Si), manganese (Mn), chrome (Cr), calcium (Ca), copper (Cu), zirconium (Zr), aluminum (Al) and sodium (Na).

According to another aspect of the present invention, when the MgO powder includes the at least one impurity, the Na has a greatest amount of weight from among the group of impurities.

According to another aspect of the present invention, there is provided a plasma display panel (PDP) including a first substrate and a second substrate which face each other; a barrier rib disposed between the first substrate and the second substrate and defining a discharge space between the first substrate and the second substrate into a plurality of discharge cells; pairs of sustain discharge electrodes disposed across the plurality of discharge cells; a phosphor layer disposed in each of the plurality of discharge cells; a protective layer disposed on the pairs of sustain discharge electrodes so as to be exposed to each of the plurality of discharge cells; and a discharge gas filling the plurality of discharge cells, wherein the protective layer may include a magnesium oxide (MgO) powder including a cathode rays emission spectrum having a first emission peak in a wavelength in the range of 300 to 450 nm, a second emission peak in a wavelength in the range of 650 to 750 nm, and a ratio between 1:0.15 and 0.40 as an intensity ratio of the second emission peak with respect to the first emission peak.

According to another aspect of the present invention, the protective layer may include a first protective layer as a magnesium oxide poly-crystal thin film; and a second protective formed on the first protective layer and including an MgO powder including a cathode rays emission spectrum having a first emission peak in a wavelength in the range of 300 to 450 nm, a second emission peak in a wavelength in the range of 650 to 750 nm, and a ratio between 1:0.15 and 0.40 as an intensity ratio of the second emission peak with respect to the first emission peak.

According to another aspect of the present invention, the second protective layer may have a maximum intensity in the range of 0.5 to 10 times higher than a maximum intensity of the first protective layer.

According to another aspect of the present invention, the second protective layer of the protective layer may be formed on portions of the first protective layer, which correspond to the pairs of sustain discharge electrodes, in a pattern.

According to another aspect of the present invention, the second protective layer of the protective layer may be formed on an entire surface of the first protective layer, or in a pattern. The pattern may be formed on a portion on which discharge is concentrated, such as upper portions of the pairs of sustain discharge electrodes.

According to another aspect of the present invention, the MgO powder may have a cluster or poly-crystal state.

According to another aspect of the present invention, the MgO powder may include 0.05 weight % of at least one impurity selected from the group consisting of nickel (Ni), ferrum (Fe), boron (B), silicon (Si), manganese (Mn), chrome (Cr), calcium (Ca), copper (Cu), zirconium (Zr), aluminum (Al) and sodium (Na).

According to another aspect of the present invention, the MgO powder may include Na having a greatest amount from among the group. In particular, the MgO powder of the second protective layer may include Na having a greatest amount from among the impurities of the MgO powder.

According to another aspect of the present invention, the discharge gas may include at least 10 volume % of xenon (Xe) based on 100 volume % of the discharge gas.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become more apparent and more readily appreciated from the following description of the embodiments, taken in conjunction with the accompanying drawings of which.

DETAILED DESCRIPTION OF THE EMBODIMENTS

Figure 1:
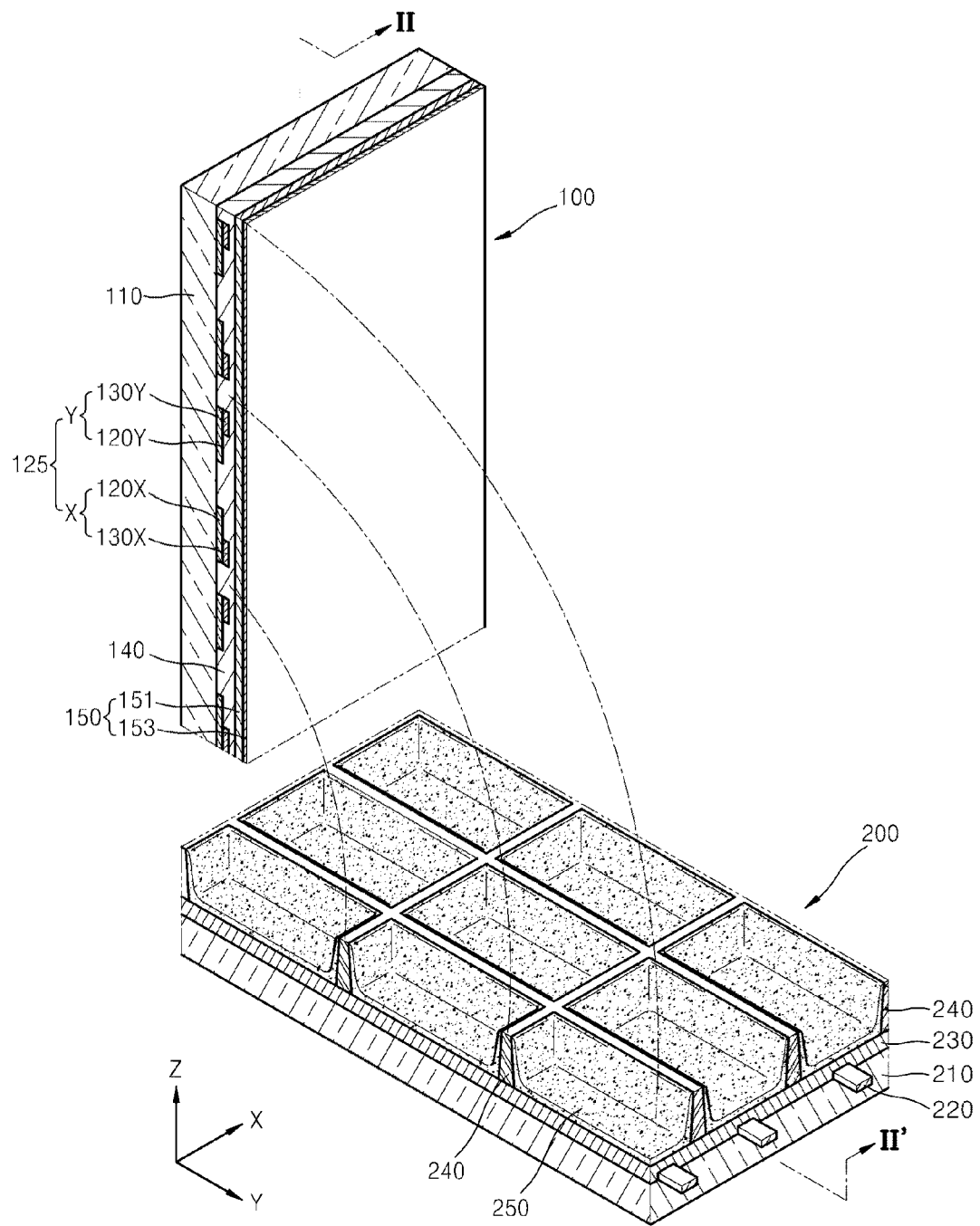
FIG. 1 is a perspective view of a plasma display panel (PDP) according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
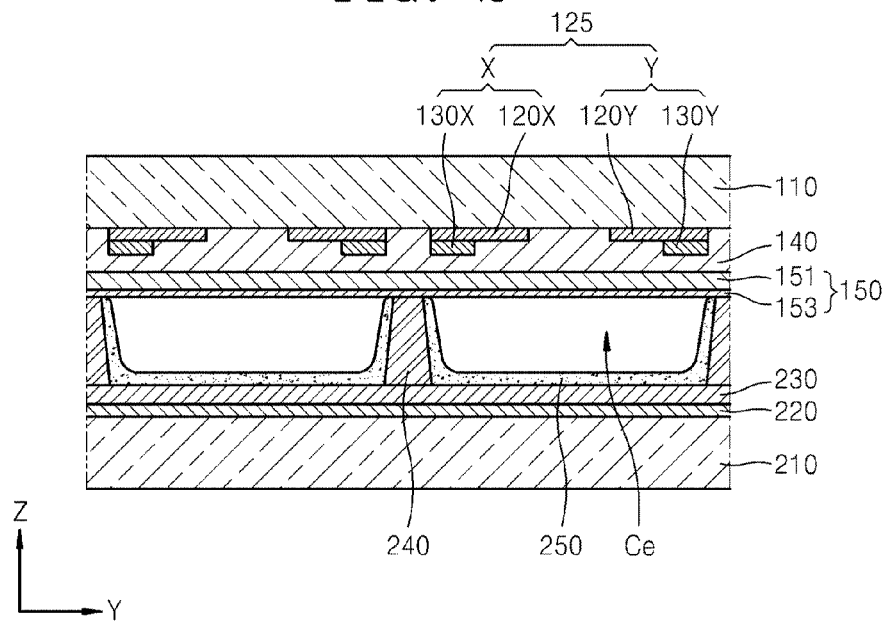
FIG. 2 is a cross-sectional view of the PDP taken along a line II-II of FIG. 1.

Hereinafter, a plasma display panel (PDP) including a protective layer formed of a material for preparing a protective layer will be described with regard to an exemplary embodiment of the invention with reference to FIGS. 1 and 2. FIG. 1 is a perspective view of a PDP according to an embodiment of the present invention. FIG. 2 is a cross-sectional view of the PDP taken along a line II-II of FIG. 1.

Referring to FIG. 1, the PDP includes an upper panel 100 emitting a light beam to the outside to display a predetermined image, and a lower panel 200 including phosphor formed thereon to emit a light beam. The upper panel 100 includes a first substrate 110, a transparent electrode, a bus electrode, an upper dielectric layer 140 and a protective layer 150. In particular, a plurality of pairs of sustain discharge electrodes 125 are disposed on the first substrate 100 formed of glass and extend in an x-axis direction. The pairs of sustain discharge electrodes 125 each include a sustain electrode X and a scan electrode Y to which a voltage is alternately applied to generate a sustain discharge. The sustain electrode X includes a sustain transparent electrode 120X and a sustain bus electrode 130X. The scan electrode Y includes a scan transparent electrode 120Y and a scan bus electrode 130Y. The upper dielectric layer 140 and the protective layer 150 are sequentially stacked in the stated order on the first substrate 110 so as to cover the pairs of sustain discharge electrodes 125. The upper dielectric layer 140 protects the pairs of sustain discharge electrodes 125 from direct collision of charged particles participating in discharge. The upper dielectric layer 140 is protected by the protective layer 150.

The protective layer 150 will now be described in more detail. While not required in all aspects, the shown protective layer 150 includes a first protective layer 151 and a second protective layer 153. The first protective layer 151 may be a thin film formed of magnesium oxide and may be formed using a deposition method (e.g., an e-beam deposition method, an ion-plating method, etc.) by using a single crystal magnesium oxide pellet or poly-crystal magnesium oxide sinter as a source, but the invention is not limited thereto. The magnesium oxide pellet is formed by compressing a magnesium oxide powder. The poly-crystal magnesium oxide sinter is prepared by sintering a magnesium oxide powder. The magnesium oxide powder used in the formation of the magnesium oxide pellet is prepared using a precipitation method, a vapor phase method, etc.

The second protective layer 153 may be formed by dispersing the magnesium oxide powder in a solvent to form a solution and then coating the solution on the first protective layer 151 by using a spin coating method, a spray method, a printing method, etc. The solution may include various additives that are anhydrous components, such as a dispersant, a surfactant, an antioxidant, etc., in addition to the solvent. However, it is understood that the invention is not limited to forming the second protective layer in this way.

The magnesium oxide powder may be obtained by precipitating magnesium ions dissolved in seawater into magnesium hydroxide by using sodium hydroxide, calcium hydroxide or calcined dolomite. The magnesium oxide powder may be prepared by forming magnesium hydroxide by a reaction represented by Formula 1, and then, annealing the magnesium hydroxide by a reaction represented by Formula 2. The magnesium oxide powder is prepared by a precipitation method, and has a cluster or poly-crystal state. A cluster refers to a particle shape, and specifies that primary particles are combined to form a secondary particle. At this time, the primary particles may be formed in single crystals or poly-crystals. In addition, the single crystal or the poly-crystals may be aggregated to form a cluster having poly-crystal characteristics.

$$MgCl_2 + 2NaOH = Mg(OH)_2 + 2NaCl \quad \text{Formula 1}$$

$$Mg(OH)_2 \rightarrow MgO + H_2O \quad \text{Formula 2}$$

The magnesium oxide powder, which is a material of the second protective layer 153, has a first emission peak in a wavelength in the range of 300 to 450 nm and a second emission peak in a wavelength in the range of 650 to 750 nm, and exhibits cathode rays emission spectrum characteristics having a ratio between 1:0.15 and 0.40 as an intensity ratio of the second emission peak with respect to the first emission peak. Since the second protective layer 153 is formed by coating the magnesium oxide powder that is prepared as a solution, the second protective layer 153 also has cathode rays emission spectrum characteristics.

On the other hand, the first protective layer 151, which is a magnesium oxide thin film, has a first emission peak in a wavelength in the range of 380 to 400 nm and a second emission peak in a wavelength in the range of 700 to 750 nm, and has a ratio between 1:0.05 to 0.15 as an intensity ratio of the second emission peak with respect to the first emission peak.

The second protective layer 153 has the maximum intensity in the range of 0.5 to 10 times higher than that of the first protective layer 151, which is a magnesium oxide thin film. The first protective layer 151 has a cluster or poly-crystal state of the magnesium oxide powder. In addition, the second protective layer 153 formed by coating the magnesium oxide powder has a cluster or poly-crystal state. Thus, although the second protective layer 153 has a cluster or poly-crystal state instead of a single crystal state, the protective layer 150 can have less defects than a protective layer formed of a different magnesium oxide powder from that of the magnesium oxide thin film, and thus the protective layer 150 can have a steady state in terms of thermodynamics.

In the shown embodiment, the protective layer 150 includes the first protective layer 151 and the second protective layer 153. However, the present invention is not limited thereto. For example, the protective layer 150 may be formed as only the second protective layer 153, or may include double layers or multi-layers having at least three layers.

With regard to the lower panel 200, a plurality of address electrodes 220 are formed on a second substrate 210 to cross the pairs of sustain discharge electrodes 125. In the shown embodiment, the address electrodes 220 extend in a Y-axis direction. A lower dielectric layer 230 is formed so as to cover the address electrodes 220, and a barrier rib 240 is formed on the lower dielectric layer 230 to define a discharge space, and thus, a plurality of discharge cells are formed. In addition, a phosphor layer 250 is formed in the discharge cells. The phosphor layer 250 is formed on lateral surfaces of the barrier rib 240 and the lower dielectric layer 230. In particular, phosphor layers 250 that are different from each other may be disposed in the discharge cells, respectively. For example, red, green and blue phosphor layers may be disposed in the discharge cells, respectively.

A discharge gas as a source of ultra violet (UV) rays is injected into the discharge cells. The discharge gas may be multicomponent-gases including xenon (Xe), krypton (Kr), helium (He), Neon (Ne), and the like, which emit appropriate UV rays by discharge excitation and are mixed in a predetermined volume ratio. In particular, the PDP according to the shown embodiment may use at least 10 volume % of Xe based on 100 volume % of the high Xe discharge gas. The high Xe discharge gas has high luminescent efficiency. However, since the high Xe discharge gas requires increased driving power consumption due to a high discharge firing voltage, there is a limit in actually or widely applying the high Xe discharge gas in consideration of all circumstances in which circuit redesign, and the like are required to increase rating power. However, since the protective layer 150 can reduce a discharge firing voltage, a problem arising with the use of the high Xe discharge gas can be overcome.

Referring to FIGS. 1 and 2, a discharge cell Ce constitutes an emissive region made independent from another adjacent discharge cell Ce by the barrier rib 240. In particular, the discharge cell Ce includes one of the pairs of sustain discharge electrodes 125 and one of the address electrodes 220 extending in a direction crossing the one of the pair of sustain discharge electrodes 125. The pairs of sustain discharge electrodes 125 may be disposed across a plurality of discharge cells Ce. The pairs of sustain discharge electrodes 125 each include the scan electrode Y and the sustain electrode X. A voltage is alternately applied to the scan electrode Y and the sustain electrode X to generate a sustain discharge with respect to each other. Prior to the sustain discharge, an address discharge occurs between the scan electrode Y and the address electrode 220. The address discharge corresponds to a pre-process discharge that generates the sustain discharge to emit a light beam to the outside by accumulating particles priming particles in the discharge cell Ce in which an image is to be displayed.

Figure 3:
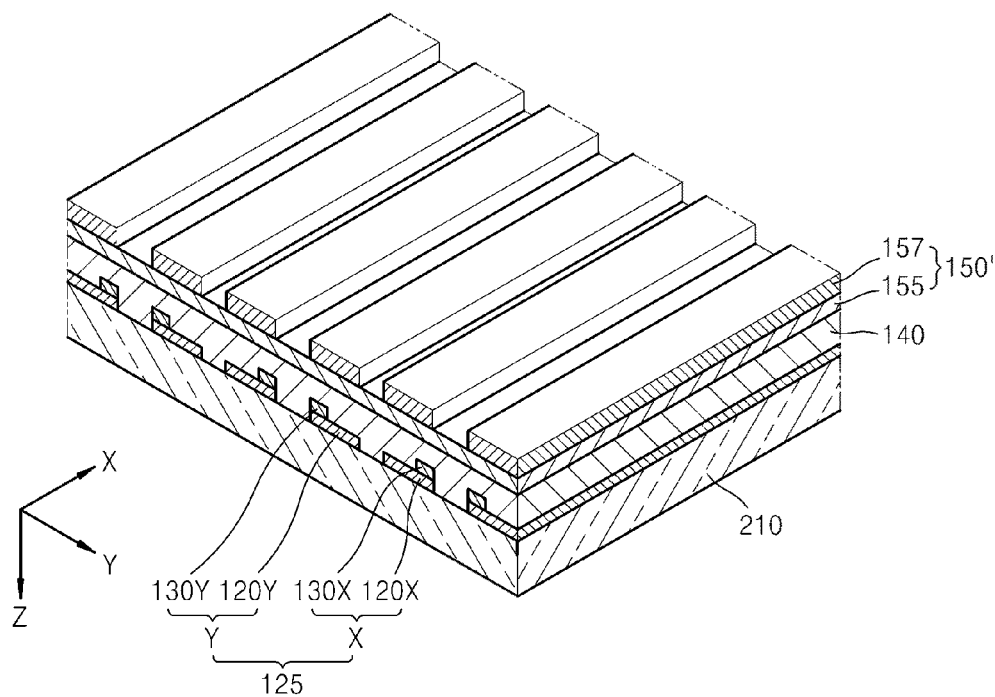
FIG. 3 is a perspective view of a PDP according to another embodiment of the present invention.

FIG. 3 is a perspective view of a PDP according to another embodiment of the present invention. In FIG. 3, a second protective layer 157 is formed on a first protective layer 155 in a shape of a predetermined pattern. The PDP according to the shown embodiment is different from the PDP of FIGS. 1 and 2 in that the second protective layer 157 is formed in a predetermined pattern, and thus the PDP according to the shown embodiment will be described in terms of its differences from the PDP of FIGS. 1 and 2.

Referring to FIG. 3, a protective layer 150' includes the first protective layer 155 and the second protective layer 157. The first protective layer 155 is a magnesium oxide thin film and is formed on an entire surface of the upper dielectric layer 140. The second protective layer 157 is formed on the first protective layer 155 by coating a solution including the magnesium oxide on predetermined regions of the first protective layer 155. For example, since the second protective layer 157 reduces a discharge firing voltage and emits a large amount of secondary electrons, the second protective layer 157 may be selectively disposed on portions of the upper dielectric layer 140, which correspond to the pairs of sustain discharge electrodes 125. In particular, the second protective layer 157 may be formed on the portions of the upper dielectric layer 140, which correspond to the pairs of sustain discharge electrodes 125, so as to extend in an X-axis direction in a stripe pattern, like the pairs of sustain discharge electrodes 125. The second protective layer 157 may be selectively formed on the upper dielectric layer 140 by using a mask.

Hereinafter, examples of a material of a protective layer according to exemplary embodiments of the invention and estimation examples for checking the cathode rays emission spectrum and the impurity content characteristics of the protective layer will be described.

EXAMPLE 1

Material of Protective Layer—Magnesium Oxide Powder A

Magnesium ions were precipitated into magnesium hydroxide by adding 1% by weight of sodium hydroxide and calcium hydroxide based on 100% by weight of seawater. A magnesium oxide powder A was prepared by annealing the magnesium hydroxide at a temperature of 500° C. or more.

EXAMPLE 2

Material of Protective Layer—Magnesium Oxide Powder B

Magnesium ions were precipitated into magnesium hydroxide by adding 1% by weight of sodium hydroxide and calcined dolomite based on 100% by weight of seawater. A magnesium oxide powder B was prepared by annealing the magnesium hydroxide at a temperature of 500° C. or more.

EXAMPLE 3

Material of Protective Layer—Magnesium Oxide Powder C

Magnesium ions were precipitated into magnesium hydroxide by adding 0.5% by weight of sodium hydroxide and calcined dolomite based on 100% by weight of seawater. Then, a magnesium oxide powder C was prepared using the same method as that of Example 2.

COMPARATIVE EXAMPLE

Material of Protective Layer—Magnesium Oxide Powder D

Magnesium vapor was prepared by resistance-heating and melting 1 g of magnesium in a chamber. Then, a magnesium oxide powder D was prepared by allowing 15 liter/min of oxygen $O_2$ and argon Ar as a main gas to flow over the magnesium vapor.

CONTROL EXAMPLE

Magnesium Oxide Thin Film E

A magnesium oxide thin film E was fabricated by forming 100 g of magnesium oxide (MgO) pellet as a source on a dielectric substance in a thickness of 7000 Å using an electron-beam evaporation method.

ESTIMATION EXAMPLE 1

Cathode Rays Emission Spectrum

The cathode ray emission characteristics of Examples 1 through 3, Comparative Example and Control Example were estimated.

Pellets using the magnesium oxide powders A through D were fabricated using a press method. The pellets were fabricated so that a ratio of powder particles on a surface of each of the pellets to the total surface area is in the range of 90 to 95%. An intensity of a light beam generated by accelerating and condensing an electron beam at 5 keV was measured with respect to each of the pellets. In addition, an intensity of a light beam generated by accelerating and condensing the electron beam at 5 keV was measured with respect to the magnesium oxide thin film E. At this time, a Ta disk source, an EGPS-3101C (available from Kimball physics), was used as a source of the electron beam, and the spot size of the electron beam was approximately 1 mm when the electron beam collides against the pellets or the thin film. A SpectraPro 2500i (available from Acton) was used in order to measure a light beam. In addition, the intensity of the light beam was represented by the sum of intensities measured with respect to three kinds of gratings of 300, 500 and 750 grating/mm.

Figure 4A:
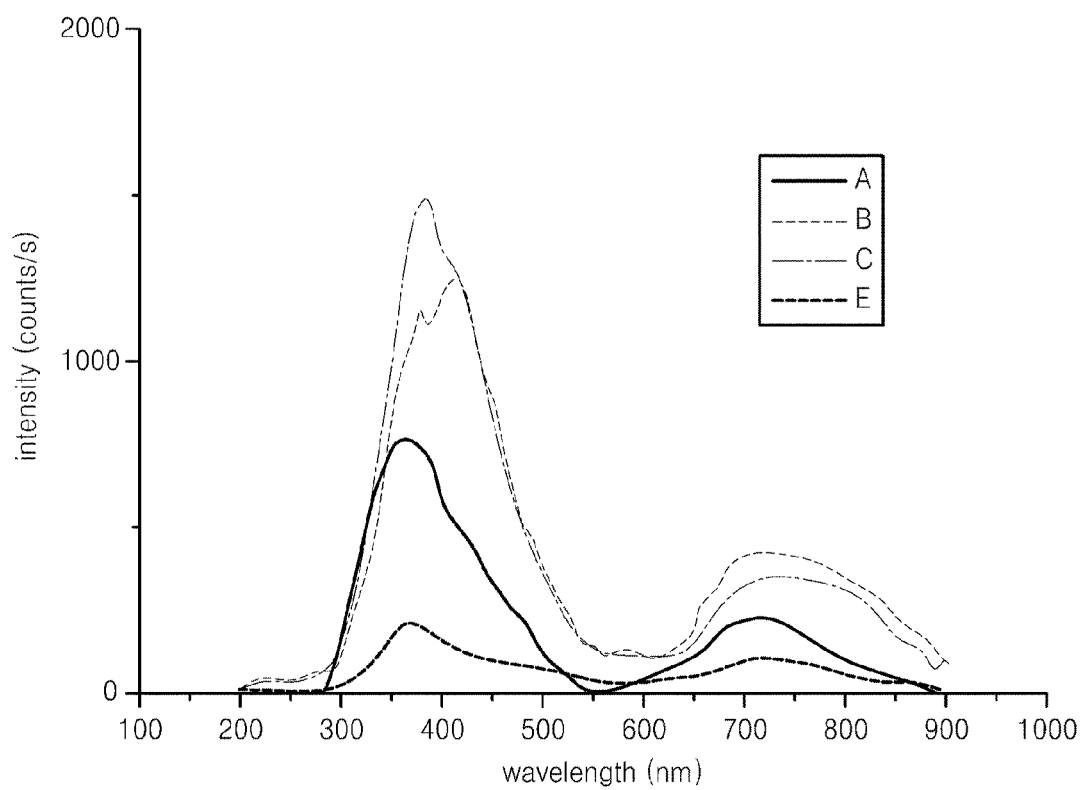
FIGS. 4A and 4B are graphs showing cathode rays emission spectrums of the present invention, a comparative example and a Control Example.

Referring to FIG. 4A, the magnesium oxide powder A has a first emission peak having an intensity of 760 counts/s in a wavelength in the range of about 300 to about 380 nm and a second emission peak having an intensity of 240 counts/s in a wavelength in the range of about 650 to about 730 nm.

The magnesium oxide powder B has a first emission peak having an intensity of 1270 counts/s in a wavelength in the range of about 380 to 450 nm and a second emission peak having an intensity of 440 counts/s in a wavelength in the range of about 700 to about 740 nm. The magnesium oxide powder C has a first emission peak having an intensity of 1480 counts/s in a wavelength in the range of about 360 to about 400 nm and a second emission peak having an intensity of 360 counts/s in a wavelength in the range of about 720 to 750 nm.

The magnesium oxide thin film E as Control Example has an emission peak having a maximum intensity of about 200 counts/s in a wavelength in the range of about 350 to about 450 nm. In addition, an emission peak having the second greatest intensity is seen in a wavelength in the range of about 650 to 750 nm.

Figure 4B:
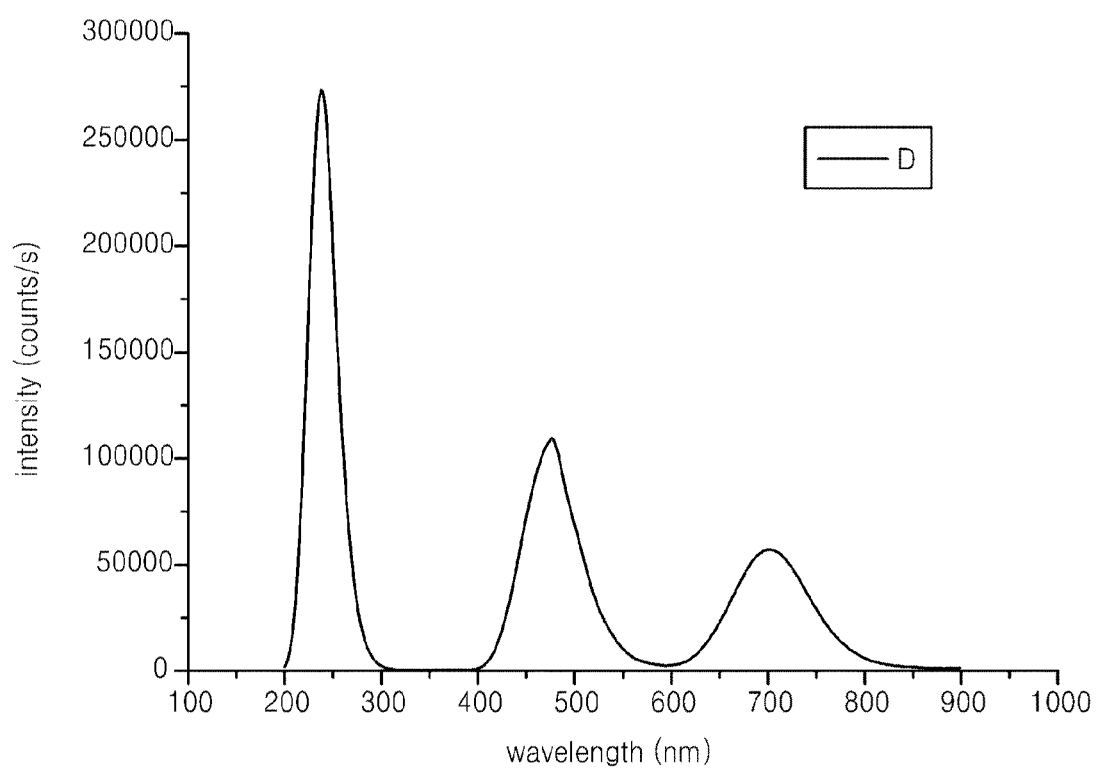

FIG. 4B shows a cathode rays emission spectrum of the magnesium oxide powder D, as Comparative Example, prepared using a vapor phase method. The magnesium oxide powder D has a first emission peak having an intensity of about 2,750,000 counts/s in a wavelength in the range of about 225 to about 275 nm, a second emission peak having an intensity of about 100,000 counts/s in a wavelength in the range of about 450 to about 550 nm, and a third emission peak having an intensity of about 50,000 counts/s in a wavelength in the range of about 650 to about 750 nm.

The magnesium oxide powders A through C, as Examples 1 through 3, have emission peaks in different wavelengths from the Comparative Example of the magnesium oxide powder D. Thus, it can be seen that the magnesium oxide powders A through C have different defects from the defects of the magnesium oxide powder D and the defects of the magnesium oxide powders A through C are remarkably little. Thus, it can be seen that each of the magnesium oxide powders A through C is a stable magnesium oxide powder. In addition, the magnesium oxide powders A through C have smaller intensities than the intensity of the magnesium oxide thin film E as the Control Example, although each of the magnesium oxide powders A through C has a cluster or poly-crystal state. Thus, it can be seen that the defects of the magnesium oxide powders A through C are remarkably little.

ESTIMATION EXAMPLE 2

In Estimation Example 2, inductive coupled plasma (ICP) analysis is performed on 5 g of each of the magnesium oxide powders A, B and C. The analysis result is shown in Table 1. The terms 'ND' indicates that a corresponding material is not detected.

TABLE 1

| (ppm) | Ni | Fe | B | Si | Mn | Cr | Ca | Cu | Zr | Al | Na |
|---|---|---|---|---|---|---|---|---|---|---|---|
| A | ND | 1.5 | ND | <1.0 | <1.0 | <1.0 | 9.1 | <1.0 | ND | ND | 155 |
| B | 5 | 3 | ND | 5 | <1.0 | <1.0 | 95 | <1.0 | ND | <1.0 | 350 |
| C | ND | 11.1 | ND | 21.0 | ND | <1.0 | 13.7 | ND | ND | 3.2 | 230 |

As shown in Table 1, it can be seen that each of the magnesium oxide powders A, B and C include impurities in about 5 ppm or less and include sodium Na having the greatest amount from among the impurities. This may be because the magnesium oxide powders A, B and C were prepared using a precipitating method with seawater.

Hereinafter, examples of a PDP protective layers formed using the above-described materials, Comparative Example and Estimation Examples will be described.

EXAMPLE 1

PDP Protective Layer—PDP Protective Layer A

A disk type Ag electrode that has a circular electrode having a diameter of 8 mm and performs an opposed discharge was formed on a substrate (i.e., PD200 available from Asahi). Then, a lead oxide (PbO) based dielectric layer was formed on the disk type Ag electrode in a thickness of about 35 μm so as to cover the disk type Ag electrode. A first protective layer having a thickness of 700 nm was formed on the dielectric layer by using an e-beam deposition method with MgO pellets.

A solution was prepared by adding 300 mg of the magnesium oxide powder A to 5 ml of an anhydrous alcohol solvent, and then a second protective layer having a thickness of 1 μm was formed on the first protective layer by coating the solution on the first protective layer by using a spin coating method. Thus, the fabrication of a PDP protective layer was completed.

EXAMPLE 2

PDP Protective Layer—PDP Protective Layer B

A PDP protective layer B was fabricated in the same manner as in Example 1 of a PDP protective layer except that the magnesium oxide powder B was used instead of the magnesium oxide powder A.

EXAMPLE 3

PDP Protective Layer—PDP Protective Layer C

A PDP protective layer C was fabricated in the same manner as in Example 1 of a PDP protective layer except that the magnesium oxide powder C was used instead of the magnesium oxide powder A.

COMPARATIVE EXAMPLE

PDP Protective Layer—PDP Protective Layer D

A PDP protective layer D was fabricated in the same manner as in Example 1 of a PDP protective layer except that the magnesium oxide powder D was used instead of the magnesium oxide powder A.

ESTIMATE EXAMPLE 3

In Estimation Example 3, surfaces of the PDP protective layers A through D were photographed, and then crystal states of the surfaces were checked with the naked eye.

Figure 5A:
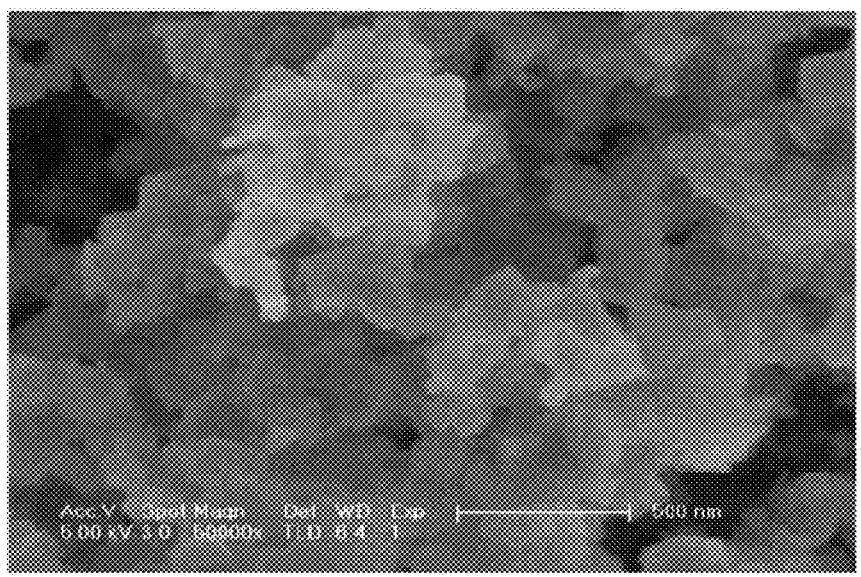
FIGS. 5A through 5C are SEM images of protective layers according to an embodiment of the present embodiment.
Figure 5B:
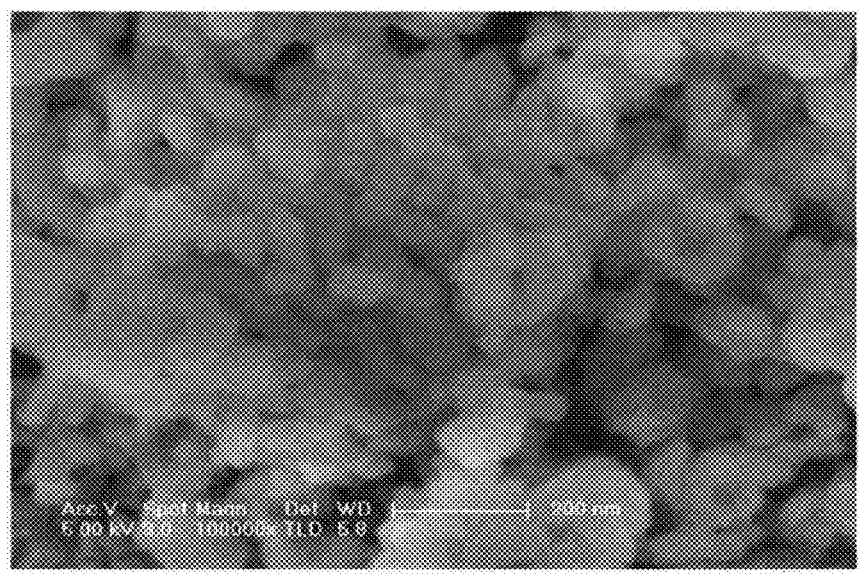
Figure 5C:
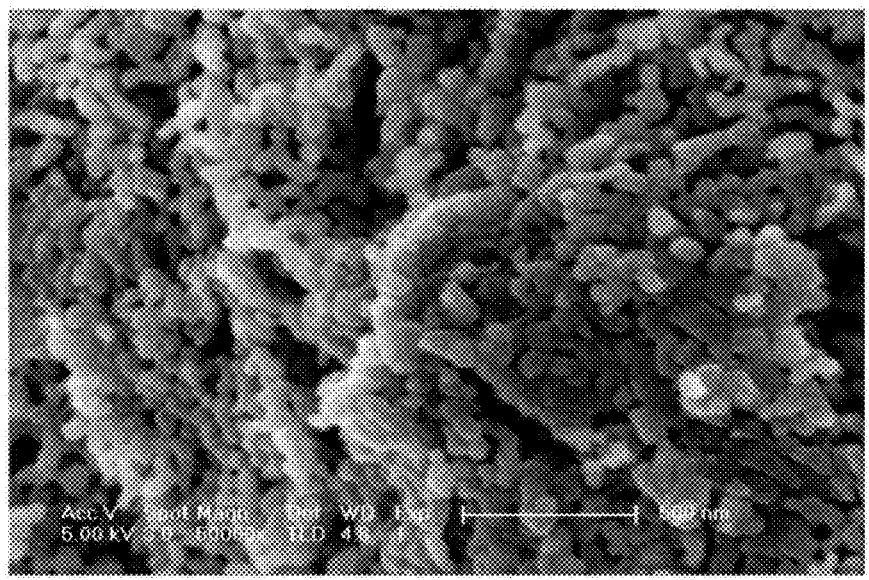
Figure 5D:
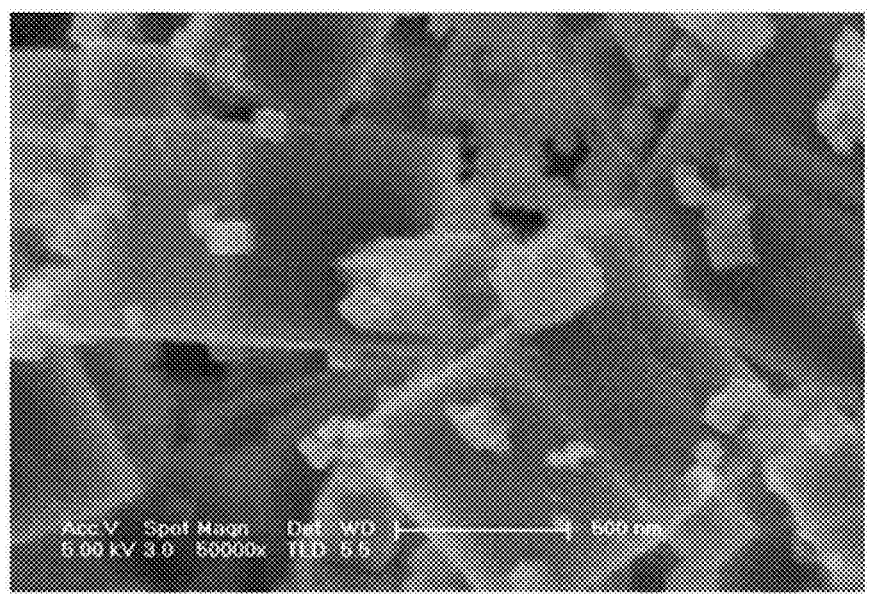
FIG. 5D is a SEM image of a comparative example.

FIGS. 5A through 5D are SEM images of the PDP protective layers A, B, C and D, respectively. FIGS. 5A, 5C and 5D are SEM images captured at a magnifying ratio of 50,000. FIG. 5B is a SEM image captured at a magnifying ratio of 100,000.

Referring to FIGS. 5A through 5D, it can be seen that each of the magnesium oxide powders A and B has a poly-crystal state and that the magnesium oxide powder C has a cluster state. In addition, the magnesium oxide powder D prepared using a vapor phase method has a single crystal state.

ESTIMATION EXAMPLE 4

In Estimation Example 4, the discharge firing voltages of the PDP protective layers A through D were measured. As Control Example, a discharge firing voltage of the magnesium oxide thin film E was measured. In particular, at a discharge gas atmosphere of 15 volume % of xenon (Xe) and 85 volume % of neon, the discharge firing voltages were measured by driving a sine wave of 2 kHz.

Figure 6:
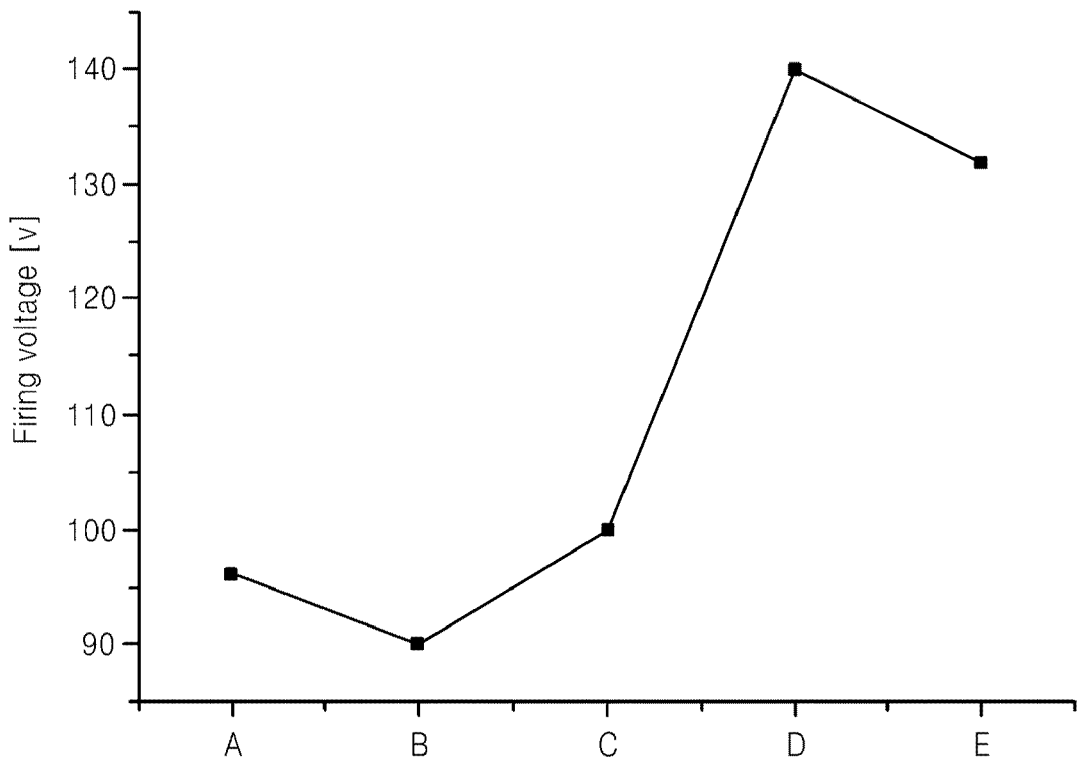
FIG. 6 is a graph showing discharge characteristics with respect to a discharge firing voltage.

Referring to FIG. 6, the discharge firing voltages of the PDP protective layers A through C are equal to or less than about 100 V. However, the discharge firing voltages of the Comparative Example of the PDP protective layer D and of the Control Example of the magnesium oxide thin film E are equal to or more than about 130 V. Thus, when a magnesium oxide powder according to an embodiment of the present invention is used, a discharge firing voltage can be reduced by about 20% or more, as compared to conventional art.

ESTIMATION EXAMPLE 5

In Estimation Example 5, secondary electron emission characteristics were estimated.

In particular, a solution was prepared by adding 300 mg of each of the magnesium oxide powders A through D to 5 ml of an anhydrous alcohol solvent. The solution was coated on a silicon wafer having a size of 2×2.5 cm, and then the solution was excited by an ultra violet (UV) source corresponding to 160 nm for five minutes. Five minutes after the UV source was removed, the amount of electrons emitted to an electron detector disposed above the substrate by about 1 to 2 cm was measured.

Figure 7:
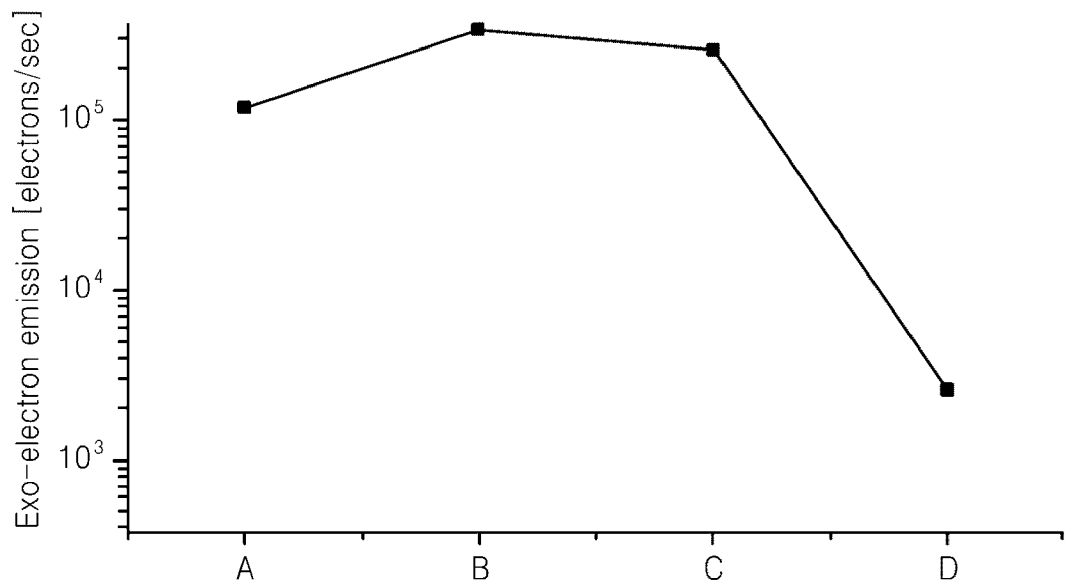
FIG. 7 is a graph showing photoelectron emission characteristics.

Referring to FIG. 7, about $10^5$ electrons are emitted from the magnesium oxide powders A through C. However, about $10^3$ electrons are emitted from the magnesium oxide powder D prepared by a vapor phase method.

In an actual discharge situation, a discharge firing voltage can be reduced by increasing $Y_{effective}$. $Y_{effective}$ is represented by Equation 1.

$$Y_{effective} = Y_{ion} + Y_{metastable} + Y_{photon} + Y_{exo} + \ldots \qquad (1)$$

As shown in Equation 1, the emission of effective secondary electrons in a discharge space can be determined according to exciton, photon and exo-emission, as well as potential emission by ions. Thus, according to the result of Estimation Example 8, since a PDP protective layer formed using a magnesium oxide powder according to an embodiment of the present invention emits many secondary electrons, the emission of effective secondary electrons can be increased.

According to an embodiment of the present invention, a magnesium oxide powder that has little defects and is in a thermodynamic state can be provided as a material for preparing a protective layer although the magnesium oxide powder has a poly-crystal or cluster state in order to easily fabricate the protective layer.

In addition, a PDP including the protective layer formed of the magnesium oxide powder has a little discharge firing voltage even at a discharge gas atmosphere of high Xe, high secondary emission characteristics and high efficiency.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A material for preparing a protective layer of a plasma display panel (PDP), the material comprising:
    a magnesium oxide (MgO) powder comprising a cathode rays emission spectrum having a first emission peak in a wavelength in the range of 300 to 450 nm, a second emission peak in a wavelength in the range of 650 to 750 nm, and an intensity ratio between 1:0.15 and 1:0.40 of the second emission peak with respect to the first emission peak,
    wherein the MgO powder comprises 0.05% by weight of at least one impurity selected from the group consisting of nickel (Ni), ferrum (Fe), boron (B), silicon (Si), manganese (Mn), chrome (Cr), calcium (Ca), copper (Cu), zirconium (Zr), aluminum (Al) and sodium (Na).

2. The material of claim 1, wherein the MgO powder has a cluster or poly-crystal state.

3. The material of claim 1, wherein the MgO powder has purity in the range of 99.95% by weight of the powder through 100% by weight of the powder.

4. The material of claim 1, wherein the MgO powder comprises 0.05% by weight of at least one impurity selected from the group consisting of nickel (Ni), ferrum (Fe), boron (B), silicon (Si), manganese (Mn), and sodium (Na).

5. The material of claim 1, wherein, when the MgO powder comprises the at least one impurity, the Na is found in a greater amount amongst the group of impurities of the MgO powder.

6. A plasma display panel (PDP) comprising:
a first substrate and a second substrate which face each other to define a discharge space therebetween;
a barrier rib disposed between the first substrate and the second substrate and defining the discharge space into a plurality of discharge cells;
pairs of sustain discharge electrodes disposed across the plurality of discharge cells;
a phosphor layer disposed in each of the plurality of discharge cells;
a protective layer disposed on the pairs of sustain discharge electrodes so as to be exposed to each of the plurality of discharge cells; and
a discharge gas filling the plurality of discharge cells,
wherein the protective layer comprises a magnesium oxide (MgO) powder comprising a
cathode rays emission spectrum having a first emission peak in a wavelength in a range of 300 to 450 nm, a second emission peak in a wavelength in the range of 650 to 750 nm, and an intensity ratio between 1:0.15 and 1:0.40 as an intensity ratio of the second emission peak with respect to the first emission peak,
wherein the MgO powder comprises 0.05% by weight of at least one impurity selected from the group consisting of nickel (Ni), ferrum (Fe), boron (B), silicon (Si), manganese (Mn), chrome (Cr), calcium (Ca), copper (Cu), zirconium (Zr), aluminum (Al) and sodium (Na).

7. The PDP of claim 6, wherein the protective layer comprises:
a first protective layer comprising a magnesium oxide poly-crystal thin film; and
a second protective layer formed on the first protective layer and comprising the MgO powder comprising the cathode rays emission spectrum having a first emission peak in a wavelength in the range of 300 to 450 nm, the second emission peak in a wavelength in the range of 650 to 750 nm, and the intensity ratio between 1:0.15 and 1:0.40 of the second emission peak with respect to the first emission peak.

8. The PDP of claim 7, wherein the second protective layer has a maximum intensity in the range of 0.5 to 10 times higher than a maximum intensity of the first protective layer.

9. The PDP of claim 7, wherein the second protective layer of the protective layer is formed on portions of the first protective layer, which correspond to the pairs of sustain discharge electrodes, in a pattern.

10. The PDP of claim 9, wherein the pattern of the second protective layer is in the form of a stripe pattern.

11. The PDP of claim 10, wherein each stripe of the stripe pattern is formed over each of the sustain discharge electrodes.

12. The PDP of claim 7, wherein when the MgO powder of the second protective layer comprises the at least one impurity, the Na is in a greatest amount from among the impurities of the MgO powder.

13. The PDP of claim 6, wherein the MgO powder has a cluster or poly-crystal state.

14. The PDP of claim 6, wherein the MgO powder comprises 0.05% by weight of at least one impurity selected from the group consisting of nickel (Ni), ferrum (Fe), boron (B), silicon (Si), manganese (Mn), and sodium (Na).

15. The PDP of claim 6, wherein when the MgO powder comprises the at least one impurity, the Na is found in a greater amount amongst the impurities of the MgO powder.

16. The PDP of claim 6, wherein the discharge gas comprises at least 10 volume % of xenon (Xe) based on 100 volume % of the discharge gas.

17. The PDP of claim 6, further comprising an upper dielectric layer disposed between the pairs of sustain discharge electrodes and the protective layer.

18. The PDP of claim 6, further comprising an address electrode crossing the pairs of sustain discharge electrodes.

19. The PDP of claim 6, further comprising a lower dielectric layer disposed between the address electrode and the phosphor layer.

20. A plasma display panel (PDP) comprising:
a first substrate and a second substrate which face each other to define a discharge space therebetween;
a barrier rib disposed between the first substrate and the second substrate and defining the discharge space into a plurality of discharge cells;
pairs of sustain discharge electrodes disposed across the plurality of discharge cells;
a phosphor layer disposed in each of the plurality of discharge cells;
a protective layer disposed on the pairs of sustain discharge electrodes so as to be exposed to each of the plurality of discharge cells; and
a discharge gas filling the plurality of discharge cells,
wherein the protective layer comprises a magnesium oxide (MgO) powder comprising a
cathode rays emission spectrum having a first emission peak in a wavelength in a range of 300 to 450 nm, a second emission peak in a wavelength in the range of 650 to 750 nm, and an intensity ratio between 1:0.15 and 1:0.40 as an intensity ratio of the second emission peak with respect to the first emission peak,
wherein the protective layer comprises:
a first protective layer comprising a magnesium oxide poly-crystal thin film; and
a second protective layer formed on the first protective layer and comprising the MgO powder comprising the cathode rays emission spectrum having a first emission peak in a wavelength in the range of 300 to 450 nm, the second emission peak in a wavelength in the range of 650 to 750 nm, and the intensity ratio between 1:0.15 and 1:0.40 of the second emission peak with respect to the first emission peak.

21. The PDP of claim 20, wherein the second protective layer has a maximum intensity in the range of 0.5 to 10 times higher than a maximum intensity of the first protective layer.

22. The PDP of claim 20, wherein the second protective layer of the protective layer is formed on portions of the first protective layer, which correspond to the pairs of sustain discharge electrodes, in a pattern.

23. The PDP of claim 22, wherein the pattern of the second protective layer is in the form of a stripe pattern.

24. The PDP of claim 23, wherein each stripe of the stripe pattern is formed over each of the sustain discharge electrodes.

25. The PDP of claim 20, wherein when the MgO powder of the second protective layer comprises the at least one impurity, the Na is in a greatest amount from among the impurities of the MgO powder.

* * * * *